United States Patent [19]
Barson

[11] 3,779,073
[45] Dec. 18, 1973

[54] TIRE TESTING MACHINE

[75] Inventor: Clifford Ward Barson, Sutton Coldfield, England

[73] Assignee: Dunlop Limited, London, England

[22] Filed: Apr. 4, 1972

[21] Appl. No.: 240,918

[52] U.S. Cl. ............................................. 73/146
[51] Int. Cl. ....................................... G01m 17/02
[58] Field of Search ................................. 73/146, 8

[56] References Cited
UNITED STATES PATENTS
1,902,307  3/1933  Larkin ............................. 73/146
3,060,734  10/1962  Obarski et al. ................. 73/146

FOREIGN PATENTS OR APPLICATIONS
853,125  11/1939  France ............................. 73/146

Primary Examiner—Donald O. Woodiel
Attorney—Richard K. Stevens et al.

[57] ABSTRACT

A tire testing machine with rotatable drum and mounting means to permit the tire to be contacted with the drum. The drum comprises an annular flange and the mounting means is pivotally mounted radially inwardly of the flange about an axis perpendicular to the axis of rotation of the drum and passing through the surface of the drum. Preferably the tire mounting means can also be moved to steer the tire and to move it laterally across the drum.

14 Claims, 4 Drawing Figures

TIRE TESTING MACHINE

This invention relates to a tire testing machine, and particularly to a machine which is capable of testing tires at high speed.

According to the present invention a tire testing machine comprises a rotatable drum and mounting means for a tire to permit the tire to be contacted with the drum, the drum comprising an annular flange supported about its axis and the mounting means for the tire being pivotally mounted radially inwardly of the flange about an axis which is perpendicular to the axis of rotation of the drum and passes through the surface of the drum.

Preferably the annular flange is supported at one edge in order to leave the drum effectively hollow and accessible from the opposite edge. The mounting means for the tire may thus be pivotally mounted about a king pin located within the drum, and king pin axis passing through the drum surface. Preferably the tire mounting means is disposed so that the tire contact patch when the tire contacts the drum may be centered about the king pin axis. This enables the tire to be steered on the drum, by pivotal movement of the mounting means, without any sideways movement or longitudinal movement of the tire taking place during its steering motion.

Preferably also the tire mounting means is movable about an axis which is tangential to the drum surface, crossing the king pin axis preferably at the center of the tire contact patch. This may be achieved by supporting the tire mounting means in a cage which is suspended from a pair of pivotal mountings disposed in front of and behind the tire contact area of the machine with a common pivotal axis tangential to the drum surface as described above. Preferably means are provided to move the tangential axis in the direction perpendicular to itself and perpendicular to the rotational plane of the drum to enable the tire to be moved laterally across the drum. This may be achieved, for example, by providing a means for moving the pivotal mountings for the cage.

Means may be provided for applying and measuring a load on the tire against the drum and for measuring, during rotation of the tire against the drum, the forces generated by the tire acting on its mounting, along the three mutually perpendicular axes and the moments generated by the tire about said three axes.

Suitable means to achieve this is a cube of forces in the tire mounting means which consists of a system of tensioned links each provided with means for measuring the axial force in the link. The cube of forces is movable in the tire mounting means in order to vary the load on the tire against the drum.

The movements of the tire mounting means may be controlled, for example, by piston and cylinder assemblies and may be carried out whilst the drum is rotating in order to simulate varying running conditions.

A machine in accordance with the invention is illustrated in the accompanying informal drawings in which.

Figure 1:
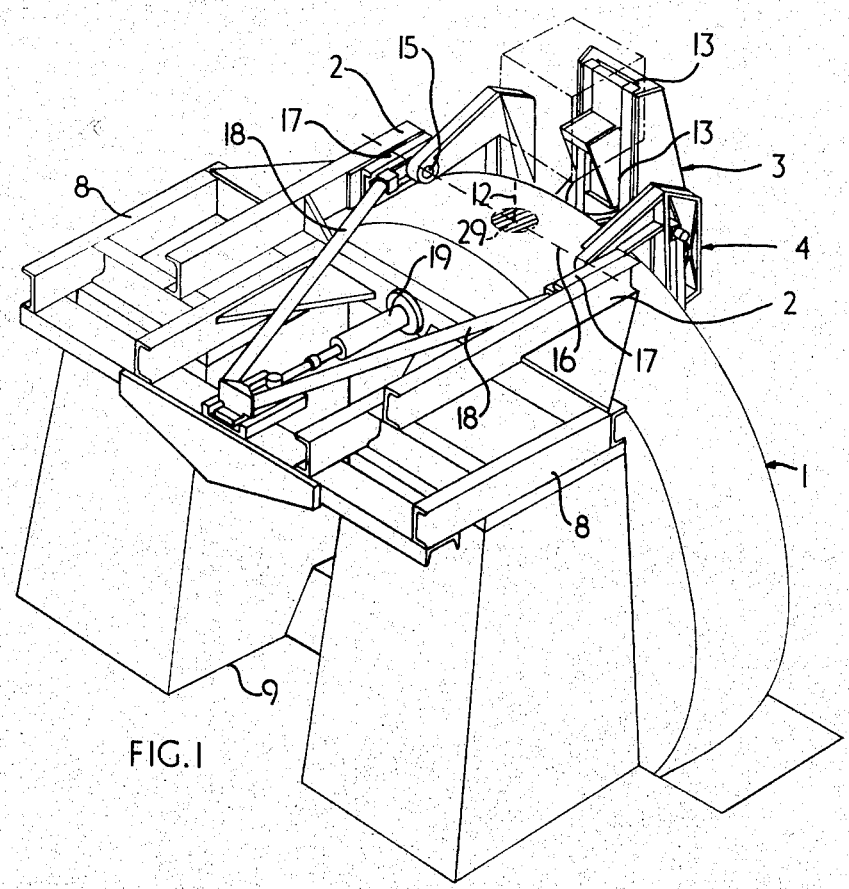
FIG. 1 is a perspective view of the machine.
Figure 2:
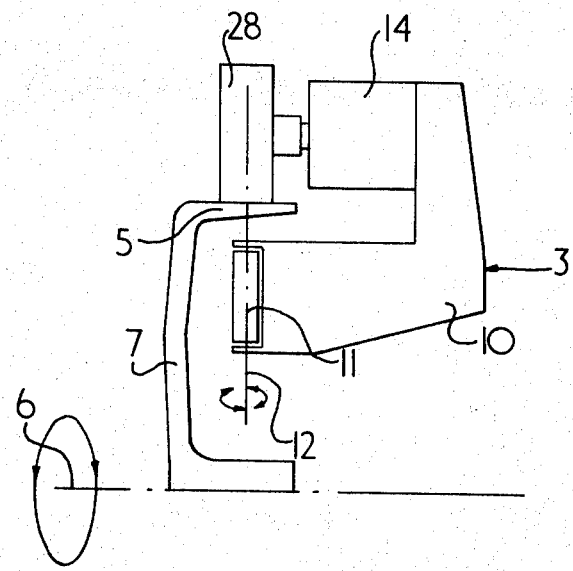
FIG. 2 is a diagram showing the king pin axis of the machine.
Figure 3:
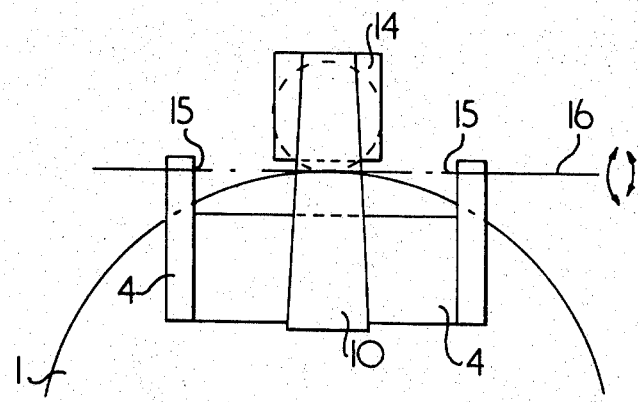
FIG. 3 is a diagram showing the camber axis of the machine.

The machine consists of a rotatable drum 1, cantilever supports 2, a tire mounting assembly 3 and supporting cage 4.

The drum 1 consists of an annular flange 5 supported at one edge about its rotational axis 6 by a disc 7. The cantilever supports 3 are carried on a frame 8 on two reinforced concrete pillars 9 opposite the supported side of the drum flange 5.

The tire mounting assembly 3 consists of an arm 10 pivotally mounted on a king pin 11 disposed within the drum 1 with its axis 12 passing through the drum surface. The arm 10 carries in a slide 13 a cube of forces assembly 14 which in turn carries an axle 15 on which a wheel and/or tire can be rotatably mounted.

The tire mounting assembly 3 is carried by the supporting cage 4 which is suspended from a pair of pivotal mountings 15 on the cantilever supports 2. The pivotal mountings have a common axis 16 which is the camber axis of the machine and is tangential with respect to the surface of the drum 1. The pivotal mountings 15 are also slidable in slides 17 by means of push rods 18 operated by a piston and cylinder assembly 19. This allows movement of the tire laterally across the drum.

Figure 4:
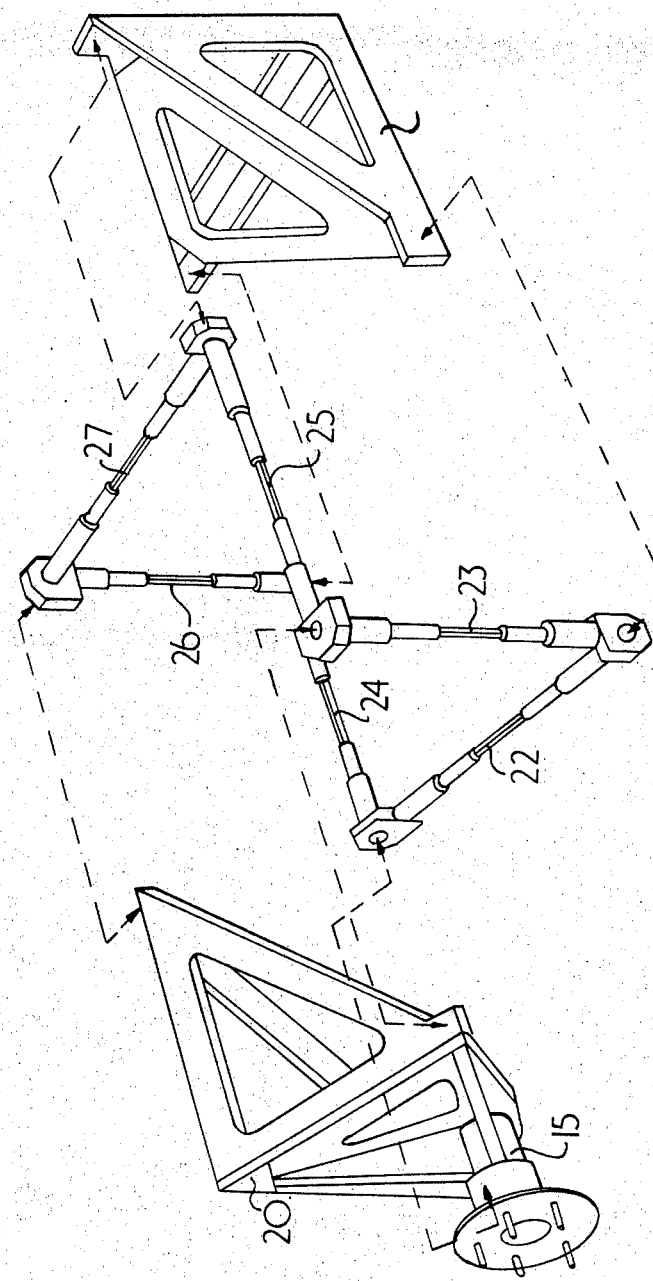
FIG. 4 is a diagram showing the details of the cube of forces.

The cube of forces assembly 14 is illustrated schematically in FIG. 4 and consists of a rigid member 21 which is to be mounted on the slide 13 (as shown in FIG. 1) on the arm 10 and a second rigid member 20 which carries the axle 15 for the wheel and/or tire. The two rigid members 20 and 21 have similar shapes and effectively each contain three edges of a cube. The two rigid members 20 and 21 are connected by six steel link rods 22, 23, 24, 25, 26 and 27 which are disposed on the other six edges of the cube. Thus link rods 22 and 27 are disposed in a horizontal direction, link rods 24 and 25 are disposed in a second horizontal direction at right angles to the first and link rods 23 and 26 are disposed vertically. Each link rod is provided with one or more strain gauges (not shown) to measure the force in the rod.

The movement of the cube of forces 14 in the slide 13 to load the tire, and the pivotal movements of the tire mountings assembly 3 and supporting cage 4 are controlled by pneumatic or hydraulic piston and cylinder assemblies which are not shown in the drawings.

In operation a tire 28 is mounted on the axle 15 and loaded against the drum by means of adjustment of the position of the cube of forces 14 in the slide 13.

The king pin axis 12 and camber axis 16 cross at the center of the tire contact patch 29.

The drum is rotated against the tire up to speeds equivalent to road speeds of 150 m.p.h. The forces developed between the tire contact patch and the drum surface are resolved into a radial force (load), a lateral force (often known as cornering force) and a longitudinal or circumferential force (often known as drag) and also the three moments acting around the axes about which the aforementioned forces act; these are the moments about the radial axis (often known as self aligning torque), the moment about the lateral axis through the contact patch (often known as the rolling resistance moment) and the moment about the longitudinal axis (often known as overturning moment).

The steering angle of the tire 28 may be varied, if desired whilst the tire is running, by pivotal movement of the tire mounting assembly 3 about the king pin 2 and similarly the camber angle of the tire can be varied by pivotal movement of the cage 4 about the axis 16.

The tire may be moved sideways across the drum by operation of the piston and cylinder assembly 19 or may be oscillated against the drum by movement of the cube of forces 14 in the slide 13.

In this way the forces generated by the tire can be measured under an enormous variety of different conditions in both forward and reverse directions.

The machine of this invention is superior to known tire testing machines in that it is compact and can measure the forces generated at high rotational speeds of the tire whilst being able to rapidly vary the steering angle, the camber angle, the height of the axis or the distance of the wheel/tire axis from the drum surface and the lateral position of the tire on the drum surface.

Having now described my invention, what I claim is:

1. A tire testing machine comprising a rotatable disc having a peripheral annular surface; tire mounting means for mounting a tire in contact with the annular surface of said disc; and means for pivotally mounting the tire mounting means radially inwardly of the annular surface about an axis which is perpendicular to the axis of rotation of the disc and which passes through the annular surface of the disc.

2. A machine according to claim 1, in which the tire mounting means is pivotally mounted about a king pin whose axis passes through the annular surface of the disc.

3. A machine according to claim 2, in which the tire mounting means is disposed so that the portion of the annular surface of the disc which contacts a mounted tire is centered about the king pin axis.

4. A machine according to claim 2, further comprising means for moving the tire mounting means about an axis which is tangential to the annular surface of the disc, and said tangential axis crosses the axis of said king pin at the center of the portion of the annular surface of the disc which contacts a mounted tire.

5. A machine according to claim 4, in which the tire mounting means is supported in a cage which is suspended from a pair of pivotal mountings disposed on either side of the portion of the annular surface of the disc which contacts a mounted tire with a common pivotal axis tangential to the annular surface of the disc.

6. A machine according to claim 5, further comprising means for moving the pivotal mountings for the cage in a direction perpendicular to said tangential axis and perpendicular to the rotational plane of the disc to enable a tire mounted on the mounting means to be moved laterally across the annular surfce of the disc.

7. A machine according to claim 1, further comprising first means for moving the tire mounting means about an axis which is tangential to the annular surface of the disc.

8. A machine according to claim 7, further comprising second means to move the tangential axis of the first moving means in a direction perpendicular to itself and perpendicular to the rotational plane of the disc to enable a tire mounted on the mounting means to be moved laterally across the annular surface of the disc.

9. A machine according to claim 1, further comprising means for applying a load on a tire mounted on the mounting means against the annular surface.

10. A machine according to claim 9, further comprisisng means for measuring, during rotation of a tire against the annular surface, the forces generated by the tire acting on its mountings along three mutually perpendicular axes and the moments generated by the tire about said three axes.

11. A machine according to claim 10, wherein the measuring means comprises a cube of forces in the tire mounting means, said cube comprising a system of tensioned links each provided with means for measuring the axial force in the link.

12. A machine according to claim 11, in which the cube of forces is movable in the tire mounting means in order to vary the load on a tire mounted on the mounting means against the annular surface.

13. A machine according to claim 1, in which movement of the tire mounting means is controlled by piston and cylinder assemblies.

14. A machine according to claim 1, in which the movements of the tire mounting means may be carried out while the disc is rotating in order to simulate varied running conditions.

* * * * *